United States Patent
Stec

(10) Patent No.: US 11,610,338 B2
(45) Date of Patent: Mar. 21, 2023

(54) METHOD OF CONTROLLING A CAMERA

(71) Applicant: FotoNation Limited, Galway (IE)

(72) Inventor: Piotr Stec, Galway (IE)

(73) Assignee: FotoNation Limited

( * ) Notice: Subject to any disclaimer, the term of this patent is extended or adjusted under 35 U.S.C. 154(b) by 0 days.

(21) Appl. No.: 17/214,424

(22) Filed: Mar. 26, 2021

(65) Prior Publication Data

US 2022/0309709 A1  Sep. 29, 2022

(51) Int. Cl.
*G06T 7/80* (2017.01)
*H04N 5/232* (2006.01)

(52) U.S. Cl.
CPC .......... *G06T 7/80* (2017.01); *H04N 5/232127* (2018.08); *G06T 2207/10016* (2013.01); *G06T 2207/10028* (2013.01)

(58) Field of Classification Search
CPC ............. G06T 7/80; G06T 2207/10016; G06T 2207/10028; H04N 5/232127
See application file for complete search history.

(56) References Cited

U.S. PATENT DOCUMENTS

| | | | |
|---|---|---|---|
| 10,469,759 B2 | 11/2019 | Ardo et al. | |
| 11,190,689 B1* | 11/2021 | Wang | H04N 5/247 |
| 2003/0025812 A1* | 2/2003 | Slatter | H04N 5/23218 |
| | | | 348/240.2 |
| 2013/0155290 A1 | 6/2013 | Huang | |
| 2015/0124049 A1* | 5/2015 | Kimura | G03B 37/00 |
| | | | 348/39 |
| 2019/0075238 A1* | 3/2019 | Cheung | H04N 5/268 |

(Continued)

FOREIGN PATENT DOCUMENTS

| WO | 2014146983 A3 | 11/2014 |
| WO | 2017140438 A1 | 8/2017 |
| WO | WO2020107266 A1 | 6/2020 |

OTHER PUBLICATIONS

Muhammad Haris, Greg Shakhnarovich, and Norimichi Ukita, "Deep Back-Projection Networks for Single Image Super-resolution", arXiv:1904.05677v1, [cs.CV], Apr. 4, 2019, 13 pages.

(Continued)

*Primary Examiner* — Fernando Alcon
(74) *Attorney, Agent, or Firm* — Lerner, David, Littenberg, Krumholz & Mentlik, LLP

(57) ABSTRACT

A method comprises displaying a first image acquired from a camera having an input camera projection model including a first focal length and an optical axis parameter value. A portion of the first image is selected as a second image associated with an output camera projection model in which either a focal length and/or an optical axis parameter value differ from the parameters of the input camera projection model. The method involves iteratively: adjusting either the focal length and/or an optical axis parameter value for the camera lens so that it approaches the corresponding value of the output camera projection model; acquiring a subsequent image using the adjusted focal length or optical axis parameter value; mapping pixel coordinates in the second image, through a normalized 3D coordinate system to respective locations in the subsequent image to determine respective values for the pixel coordinates; and displaying the second image.

19 Claims, 5 Drawing Sheets

(56) References Cited

U.S. PATENT DOCUMENTS

| | | | |
|---|---|---|---|
| 2019/0215440 A1* | 7/2019 | Rivard | G02B 27/28 |
| 2019/0306405 A1* | 10/2019 | Shin | H04N 5/232123 |
| 2019/0318538 A1* | 10/2019 | Li | G06T 13/80 |
| 2020/0167960 A1* | 5/2020 | Walls | H04M 1/0264 |
| 2020/0228774 A1* | 7/2020 | Kar | G06T 15/005 |
| 2020/0388068 A1* | 12/2020 | Yeung | G06T 15/08 |
| 2020/0404162 A1* | 12/2020 | Uno | G03B 37/04 |
| 2021/0088803 A1 | 3/2021 | O'Sullivan et al. | |
| 2021/0281764 A1 | 9/2021 | Ma | |
| 2021/0321063 A1* | 10/2021 | Abramov | G06T 7/20 |
| 2022/0180560 A1* | 6/2022 | Nakano | G06T 7/80 |
| 2022/0180563 A1* | 6/2022 | Nakano | H04N 17/004 |
| 2022/0222857 A1* | 7/2022 | Yuan | H04N 5/23296 |

OTHER PUBLICATIONS

PCT Search Report dated Jun. 7, 2022, PCT Application No. PCT/EP2022/057921, Filed Mar. 25, 2022, 15 pages.

\* cited by examiner

METHOD OF CONTROLLING A CAMERA

FIELD

The present invention relates to a method of controlling a camera.

BACKGROUND

Referring to FIG. 1, for a typical electronically controlled zoom camera 10, a processor 16 running a camera application (not shown) can be responsive to user interaction to cause an actuator 18 for a zoom lens 12 to change focal length and so vary the magnification and field of view of the camera 10.

Typically, the actuator 18 comprises a stepper motor (not shown) or equivalent mechanism and the speed of an optical zoom transition, moving from one magnification to another, is limited by the speed at which the lens assembly can be adjusted.

In this case, the zoom lens 12 is shown as a single module, but it will be appreciated that it may comprise at least an optical lens assembly coupled to an image sensor which in turn provides any acquired image to an image processing pipeline which performs basic image processing of the acquired image before it is written across a system bus 30 into memory 14, with each component being arranged as required within a given camera.

In this respect, it will be appreciated that the term camera includes any image capturing device with zoom capability and includes dedicated still cameras, video cameras, smart phones, tablet computers and security cameras. In the last case in particular, the camera application typically runs on a remote computing device with a network connection to a non-interactive application running on the camera processor 16.

Any such cameras may also have a digital zoom module 20 for extending the zoom range beyond the optical zoom capabilities of the lens 12, so that, referring to FIG. 2, when the optical zoom capability of the lens 12 reaches its maximum value, in this case 30× magnification, the digital zoom module 20 is activated to provide additional image magnification, in this case up to 40× magnification.

In FIG. 1, for the purposes of explanation, the zoom module 20 is shown separately from the lens 12, but it may be integrated into the image processing pipeline firmware so that the image written to memory is immediately provided at the required magnification. Alternatively, the functionality of the zoom module 20 can be implemented in the camera application, whether local or remote to the camera 10, so that an image acquired from the camera can be magnified before it is displayed.

In FIG. 1, when activated, the digital zoom module 20 takes the required portion 14" of a relatively low magnification image 14' which is being acquired or has been acquired from the lens 12 and (being) written to memory 14' and interpolates the image to provide a display image typically at the same size and resolution as the original low magnification image 14'. Such interpolation can employ bilinear or bicubic interpolation, but the zoom module 20 can also employ neural network type processing to provide improved quality magnified images, for example, a Deep Back-Projection Network (DBPN) such as disclosed by Muhammad Haris, Greg Shakhnarovich, and Norimichi Ukita, "Deep Back-Projection Networks for Single Image Super-resolution", arXiv:1904.05677v1, [cs.CV], 4 Apr. 2019 can be used, but it will be appreciated that any super resolution network can be employed.

Cameras or camera applications may have dedicated zoom buttons or screen icons allowing the user to select increasing or decreasing magnification and, in such cases, the portion of the displayed field of view selected to be magnified is typically centered on the displayed field of view.

However, in some cases, where for example, the camera application provides an interactive display, the portion of the displayed field of view selected to be magnified may not be centered within the display.

In other cases, the camera may also have controls which allow a user to request that the camera pan (P) and/or tilt (T) at the same time or after it is requested to zoom (Z). Examples of such PTZ cameras are fixed mount security cameras remotely controlled from a user application running on a network connected device. Again, requesting such a pan or tilt involves a delay in pan/tilt actuators physically moving the camera so that the camera optical axis is centered on the field of view.

Where the camera 10 is provided with an interactive, for example, touch screen, display (not shown), whether directly on the camera or on a network connected device running the camera application, this interaction may comprise the time involved in making an interactive gesture where the user selects a portion of the displayed field of view which it is desired to magnify—using either a pointer device or a touch screen gesture.

As shown in FIG. 2, the time taken to complete an interactive gesture, for example, t0-t1 and t2-t3, or to select a button/icon t4 can be quite short, whereas optical zoom, as well as pan or tilt are limited by the speed of their respective actuator and may lag user interaction with the camera 10 in reaching the requested zoom level or position.

This can be particularly noticeable if a user such as at time t4 is able to instantly specify, for example, an increase in zoom level, by selecting a touch screen icon or camera button to request maximum optical zoom. In the example of FIG. 2, the optical zoom only reaches this zoom level after time t5 when the user requests a further increase in zoom level requiring digital zoom. From that point, the camera can almost instantly respond to user requests to change the level of digital zoom in the region beyond maximum optical magnification and maximum optical+digital magnification, in this case 40×, as typically image interpolation can be performed at least as fast as the image frame acquisition rate of the camera.

U.S. Ser. No. 10/469,759 discloses a device including a lens assembly to focus an image or to optically zoom, a sensor array to capture an image; a memory to store instructions; and a processor to execute the instructions. The processor may execute the instructions to: cause the sensor array to capture an image; determine a field of view in the captured image; obtain parameter values based on sensor measurements associated with the captured image; obtain a digital zoom profile and an optical zoom profile based on the parameter values, the captured image, and the field of view; and jointly apply the digital zoom profile and the optical zoom profile to set the camera to the received zoom request for the field of view.

The approach of U.S. Ser. No. 10/469,759 is naïve in that it does not take into account the changing relationship between what may be an off-center selected portion of the displayed field of view and the optical axis of the camera as the camera transitions from a given zoom level to the requested zoom level. This means that as optical image magnification increases during the zoom transition, the field of view continually distorts. Thus, the benefits of switching immediately to an increased magnification, with the optical portion of the increased magnification increasing as the lens actuator 18 drives the lens to the requested magnification, are lost due to continually changing distortion of the field of view.

SUMMARY

According to a first aspect of the present invention, there is provided a method of controlling a camera according to claim 1.

Embodiments of the present invention are based on image re-projection using two camera models:

1. An input camera model representing calibrated physical lens characteristics for acquiring an image; and
2. An output camera model representing a desired projection of an output image.

Using two separate camera models for re-projection allows for:
- Supplementing optical zoom with digital zoom, when there is a difference in the focal lengths of the two camera models, without introducing distortion of the field of view, as optical zoom changes towards a requested zoom level;
- Distortion correction—for example, when the output camera has a rectilinear projection model and the input camera model is based on a different type of projection; and
- Virtual camera rotation—when the camera models are rotated relative to one another during the projection, in particular, to perform electronic image stabilization to take into account camera movement during a zoom transition.

This two-stage re-projection is not the same operation as just cropping and magnifying an input image. Cropping does not maintain realistic perspective, while re-projection according to the present invention, using two camera models, maintains realistic perspective while also enabling distortion correction and allowing for rotation of the virtual camera to enable image stabilization.

Thus, embodiments of the present method improve user experience by appropriately combining digital and optical zoom for zoom levels below a maximum range of the lens without introducing distortion of the field of view during the zoom transition.

The response to the zoom, as well as any pan or tilt, required to magnify or view an off-center selected portion of a displayed field of view is essentially instantaneous.

The input camera model is calibrated for all zoom levels and changes together with the change of optical zoom level during zoom transition. Thus, for each input image acquired while the camera is transitioning from one zoom level to another, the changing zoom level needs to be taken into account, with the method receiving information about current optical zoom from the camera before processing an acquired image.

When a user wants to select a specific zoom level, it can be set substantially instantaneously by adjusting the output camera model's focal length. This gives an instantaneous digital zoom. At the same time, the new zoom settings are sent to the optical zoom actuator and the lens actuator starts to move the zoom position to the selected level. While the zoom actuator adjusts the lens, the effective focal length of the displayed image does not change as the method iteratively recalculates the lens projection from the current zoom level to the desired zoom level at the output. The only effect the user sees is a gradual improvement of the image sharpness as the digital zoom is replaced by the optical zoom.

In a second aspect there is provided a handheld camera comprising a lens, a lens actuator configured to change a focal length of said lens and a processor configured to run a camera application and to control the camera to perform the steps of claim 1.

In a third aspect, there is provided a computer program product stored on a computer readable medium and comprising computer readable instructions which when executed on a handheld camera are configured to perform the steps of claim 1.

In a fourth aspect, there is provided a system comprising a fixed mount camera and a computer program product stored on a computer readable medium and comprising computer readable instructions which when executed on a computing device operably connected to said camera are configured to perform the steps of claim 1.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
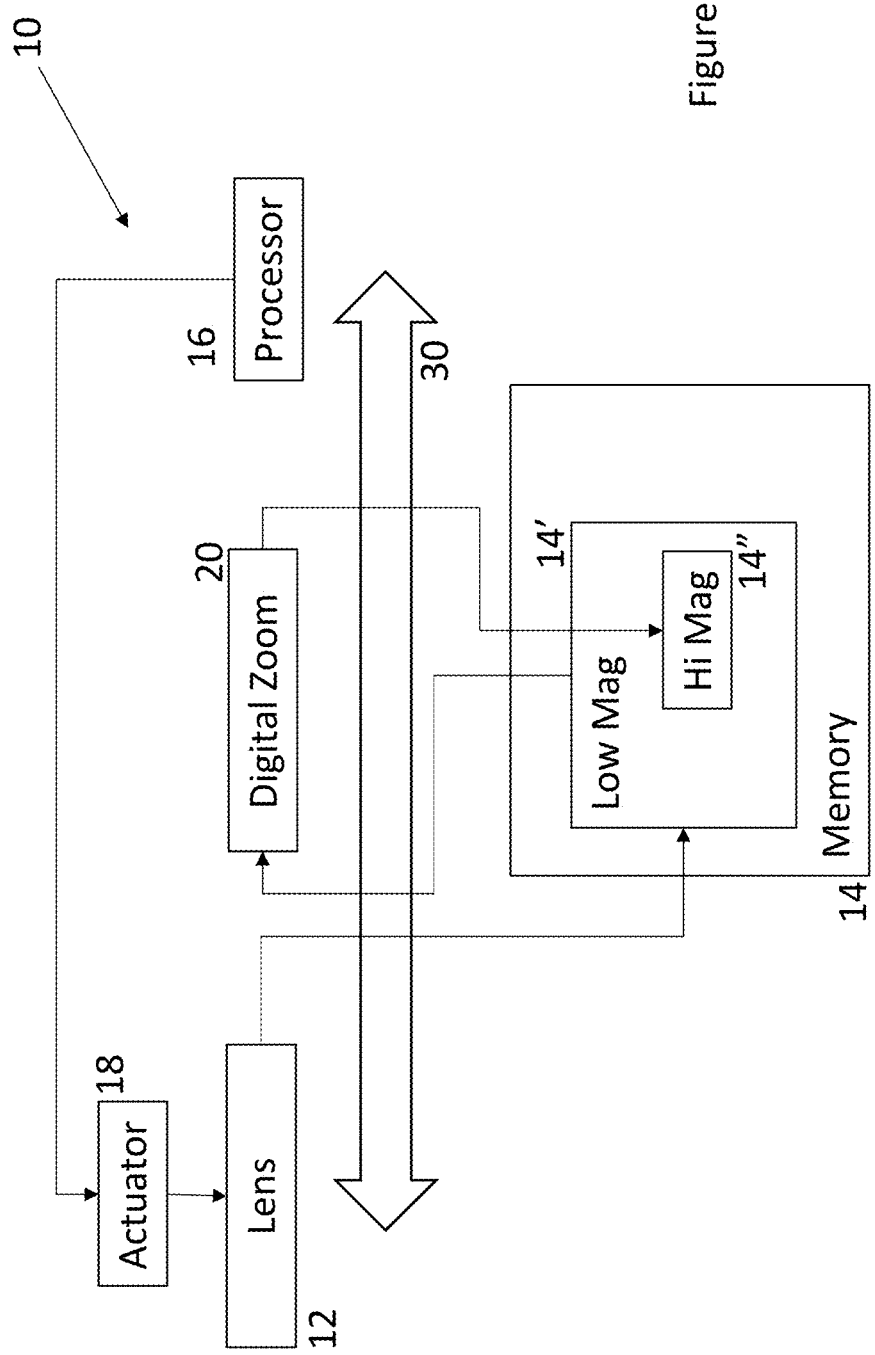
FIG. 1 shows a conventional camera with optical and digital zoom capability.
Figure 2:
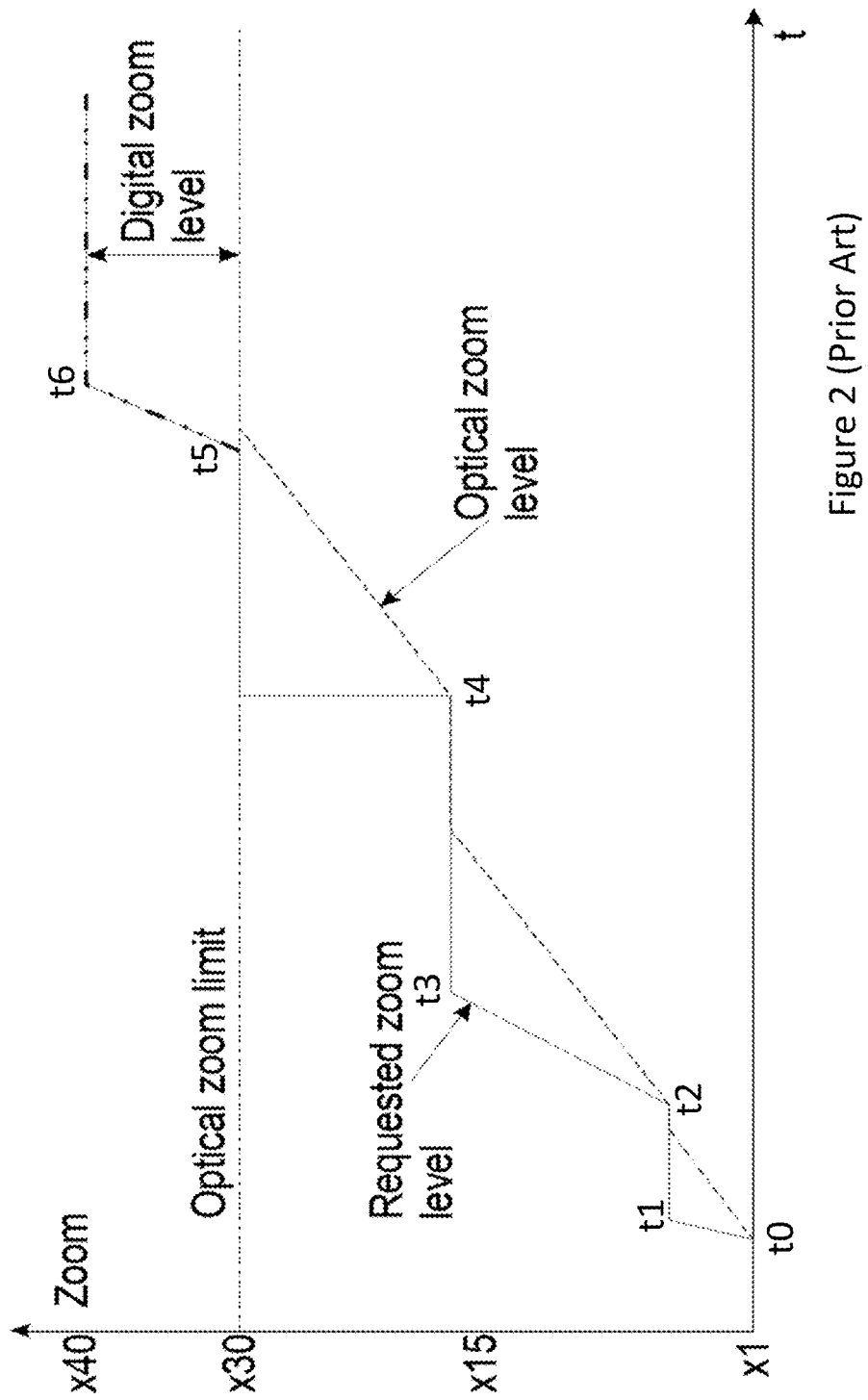
FIG. 2 illustrates the transition from optical to digital zoom in the camera of FIG. 1.
Figure 3:
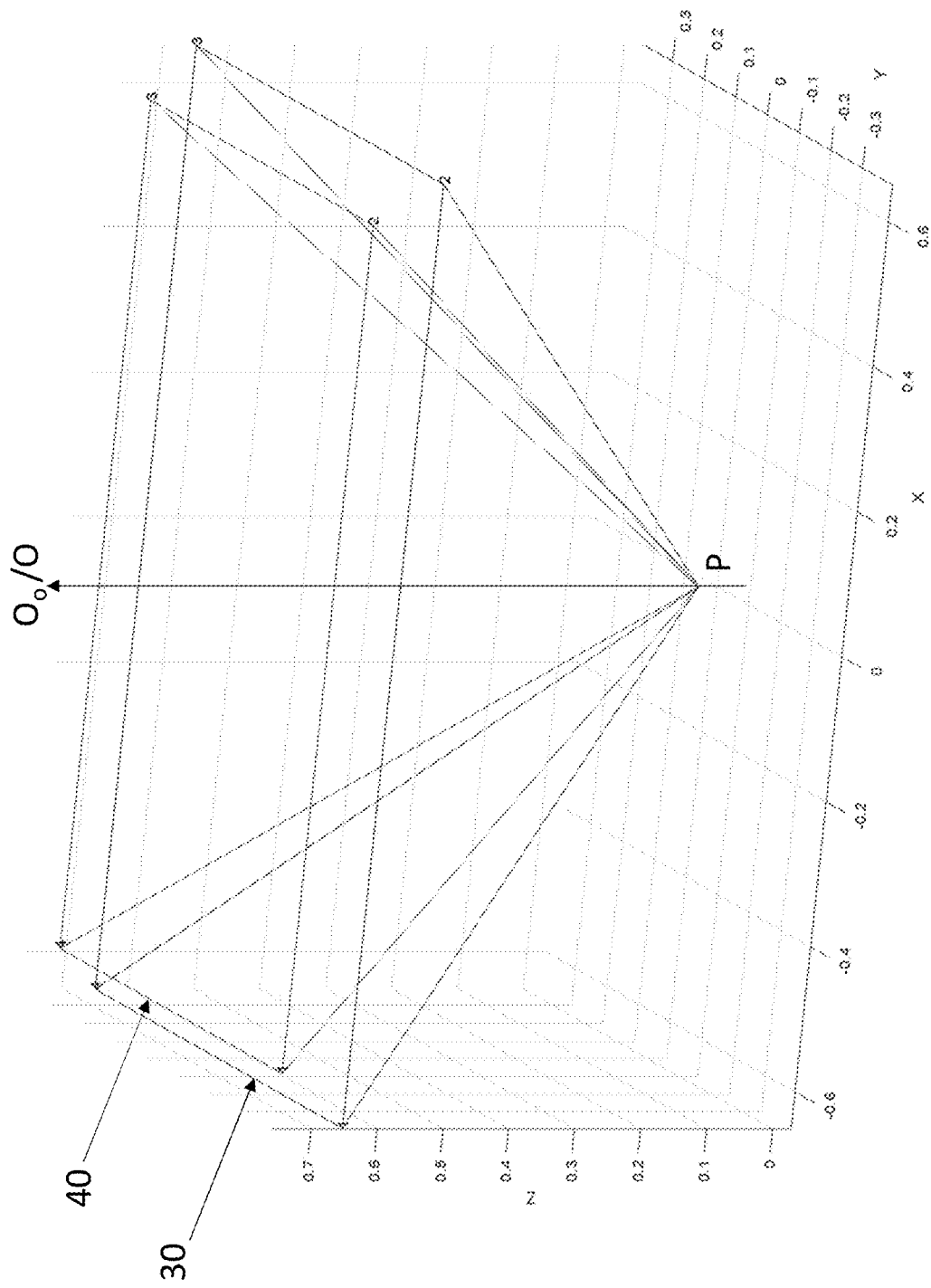
FIG. 3 illustrates an exemplary input and output camera projection employed in an embodiment of the present invention.

Referring to FIG. 3, as is well understood, a field of view of a camera for acquiring an image can be modelled with a projection model and, for the purposes of simplicity, the projection model for an input camera for acquiring an image can be represented as a 3D frustum 30 with the base of the frustum corresponding to the acquired image. Equally, a portion of the displayed version of the acquired image which is selected to be magnified or towards which the camera is to pan/tilt can be represented as a frustum 40 with an associated projection model, each frustum 30 and 40 having a common point of view P (also known as projection centre).

In this example, the camera 10 is providing a given level of optical magnification generating an acquired image with a field of view corresponding to the rectangular base of the frustum 30. In the example, an output rectangular image from within the field of view of the camera 10 has been chosen by a user, either through interaction with a touch screen display or actuation of a zoom button which is detected by a camera application. The base of frustum 40 is shown elevated above the base of frustum 30 for ease of illustration and also to indicate that the projection module for the frustum 40 includes a longer focal length than for the frustum 30.

In the example of FIG. 3, the output image corresponding to the base of the frustum 40 is centered on the acquired input image and so their respective optical axes $O_0/O$ are coincidental, however, as will be understood from the detailed description below, this is not essential.

Embodiments of the present application transform points from an acquired input image into a normalized 3D space using an input camera model and project them back to the 2D output image space using an output camera model.

Transformation of an acquired image through an input camera model and then an output camera model to produce an output image is referred to as a forward projection. In practice, however, any pixel location in the output image whose value(s) is to be determined is transformed using the output camera model into a location in the normalized 3D space and then using the input camera model into a location in the acquired image space. Acquired image data at pixel locations surrounding or adjacent the projection location in the acquired image space is then used, typically interpolated, to generate the pixel value(s) for the output image pixel location—this is referred to as backward projection.

For monochrome images, only one value per output image location needs to be calculated, but for other image formats including color formats such as RGB, YCC, LAB, the above process is repeated for each color plane of the output image.

In any case, when both cameras have the same parameters, the projections result in an identity transform (the image does not change). However, when the output camera's focal length is longer than the input one, digital zoom is provided. Alternatively, or in addition, when an output camera's optical axis is off the input camera axis, then digital panning/tilting is provided.

Let us define an output camera projection representing the desired magnification level with $F_o$ being its focal length and $O_o$ being the optical axis location in the output coordinate space.

When digital magnification is required, $F_o$ will be different than the calibrated value F for the input camera projection. $O_o$ will differ from the optical axis O for the input camera projection, when the portion (sub-region) of the displayed field of view selected to be magnified is off center.

As explained in the introduction, this can occur if a user freely selects a sub-region of a touch screen display which is to be magnified; or alternatively, this can occur if a user has requested that a camera pan or tilt.

The output camera model can be of any type including fish-eye or rectilinear, but for simplicity, a pinhole projection is used in this example.

Using backward projection, the first step is to project the output image coordinates, typically a pixel location (X,Y) to the normalized 3D space:

$$x = \frac{X - O_{Ox}}{F_O},$$

$$y = \frac{Y - O_{Oy}}{F_O}$$

$$z = 1$$

The resulting vector [x,y,z] may be normalized to the unit length but this step is optional and does not affect the end result. In the present specification, a normalized coordinate system is where all the linear dimensions are divided by the effective focal length (as above), whereas a normalized vector is a vector of length 1 (and this is not essential in the present application).

Optionally, the points in the 3D coordinate system can be additionally rotated about the origin of the 3D coordinate system to counteract movement of the camera itself during the time the optical magnification and/or optical axis of the input camera moves towards the desired magnification and optical axis of the output camera. Clearly, this is typically only a requirement for handheld cameras which are subject to camera (rather than lens) movement.

One technique in which such a rotation can be determined and limited to avoid black boundary conditions arising due to the output image extending beyond the boundary of the input image is explained in more detail in U.S. application Ser. No. 16/575,748 filed 19 Sep. 2019 (Ref: FN-648-US) the disclosure of which is herein incorporated by reference.

Other processing to determine frame-to-frame motion, for example, as disclosed in WO2014/146983 (Ref: FN-389-PCT) as well as other forms of optical or electronic image stabilization such as disclosed in WO2017/140438 (Ref: FN-495-PCT), the disclosures of which are herein incorporated by reference, can instead be employed.

In any case, whether rotated or not for image stabilization, in the next step, the coordinates in 3D space are projected to the source image using the calibrated model of the input lens.

Again, any projection model (rectilinear, fisheye, etc.) can be used here, including any type of lens distortion modelling (radial, tangential, etc.).

In the example below, a pinhole projection is extended with a radial distortion model for added realism. The first step in the pinhole (perspective) projection is division of x,y coordinates by the value of z coordinate. This projects the point from the normalized 3D coordinate system onto the X,Y plane (2D):

$$x_S = \frac{x}{z}$$

$$y_S = \frac{y}{z}$$

Then the distortion model is applied:

$$x_d = x_s(1+k_1 r^2+k_2 r^4+k_3 r^6),$$

$$y_d = y_s(1+k_1 r^2+k_2 r^4+k_3 r^6),$$

where $r=\sqrt{x_s^2+y_s^2}$ and $k_n$ are the distortion coefficients. The final step is the transformation to the source image pixel space:

$$X_d = F x_d + O_x,$$

$$Y_d = F y_d + O_y.$$

Note that in this last transformation, the optical axis coordinates of the input image $O_x$, $O_y$, which may not be the same as those $O_{ox}$, $O_{oy}$ for the output camera model, are employed.

Typically, $O_x$ and $O_y$ are found through the camera calibration process and typically do not coincide with the center of the input image. They represent the location of the optical axis of the input camera in the input image coordinate system (pixels). The output optical axis location $O_{ox}$, $O_{oy}$ can be set to the center of the output image. In that case, if there is no pan/tilt involved, the input image will be cropped symmetrically around the optical axis location. The crop region may not be centered within the input image (when $O_x$ and $O_y$ are not in the center of the image). If crop centering within the input image is required, then the values of the $O_o$, $O_{oy}$, can be set in such way, that the center of the output image, when projected back to the input image coincides with the center of the input image. When pan/tilt of the output camera is applied, the output image center projected to the input image will change its location together with the location and shape of the crop window. The nature of those changes will depend on the projection parameters of both cameras.

Note that if a camera does not have a pan/tilt mechanism and an off-center portion of a displayed image is chosen for magnification, then there will be a limit to the extent the portion can be magnified with all of the portion remaining visible. In this case, the camera application will need to choose between stopping the zoom transition at the point all of the selected portion remains visible or continuing to zoom to the requested level and either cropping some of the originally selected portion of the displayed image or show an empty area outside of the input image.

If camera movement is not being countered, then the output frustrum can remain constant during the camera zoom, pan and/or tilt transition. However, if image stabilization is being employed, then the output camera frustrum can move as the desired portion of the field of view to be displayed is moved to counteract movement of the camera itself during the time optical magnification transitions towards the desired magnification and optical axis of the output camera.

Movement of the optical axis of the input camera ($O_x$, $O_y$) may be required when the camera is equipped with an optical image stabilization system that moves either the lens barrel or the sensor. In such case, the movement is measured by the camera system in real time and passed to the digital zoom module.

It will be appreciated that any difference between frustum sizes corresponding to the input image and the output image allows some degree of freedom for the rotation of the output frustum, and this can be used either to change the virtual camera direction to facilitate digital panning or tilting and/or to provide video stabilization.

Figure 4:
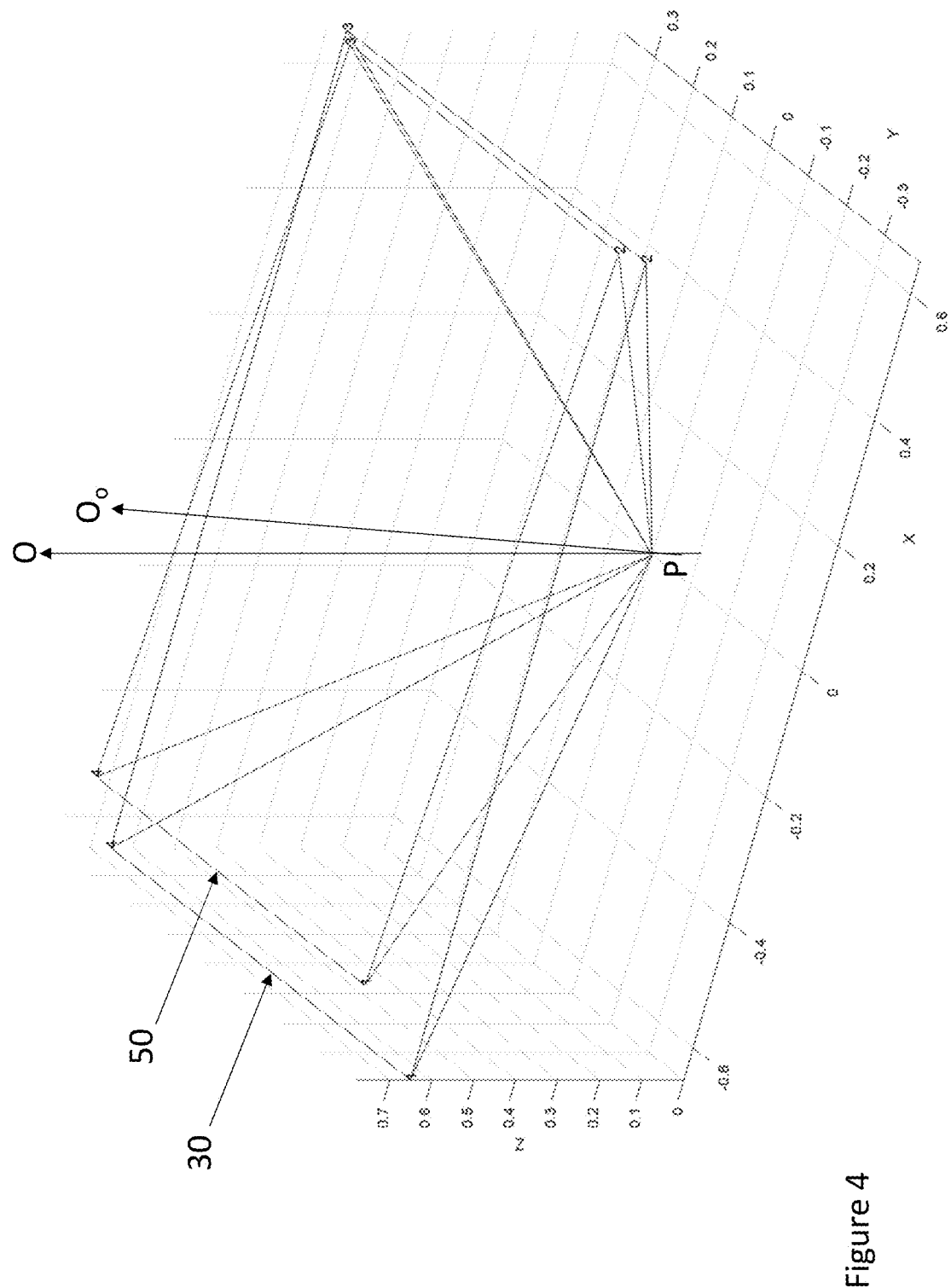
FIG. 4 illustrates an exemplary input and rotated output camera projection employed in an embodiment of the present invention.
Figure 6:
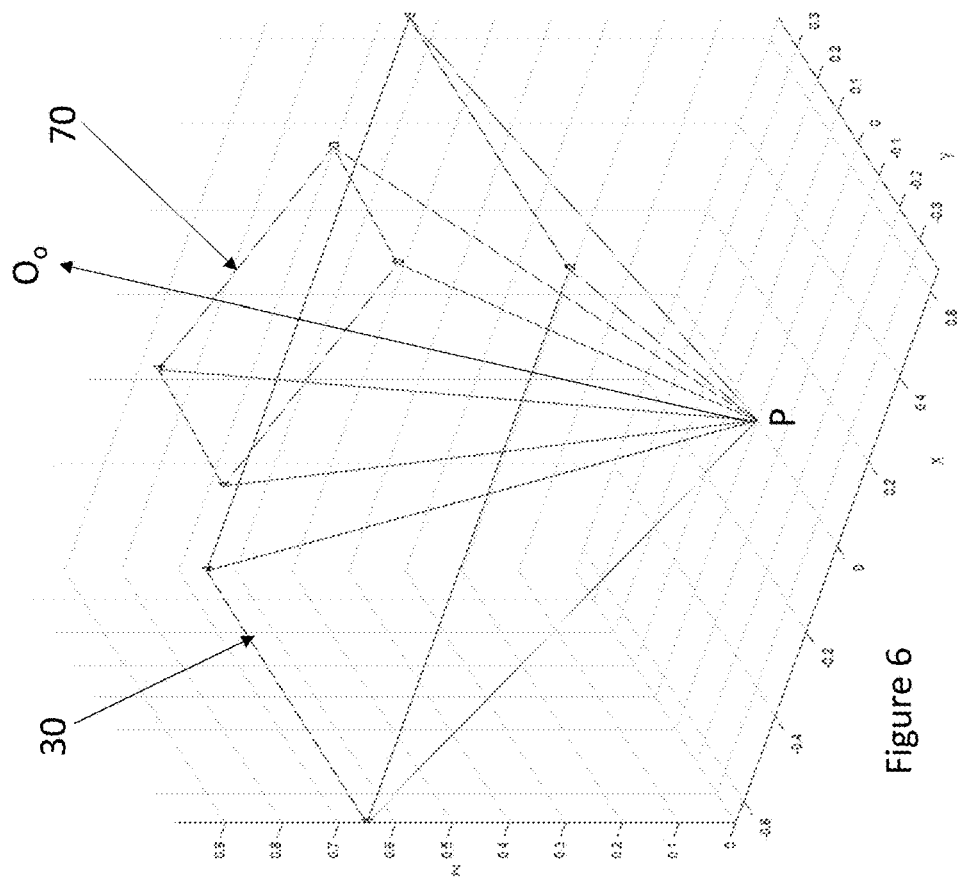
FIGS. 5 and 6 illustrate another exemplary input and output camera and rotated output projection employed in an embodiment of the present invention.
Figure 5:
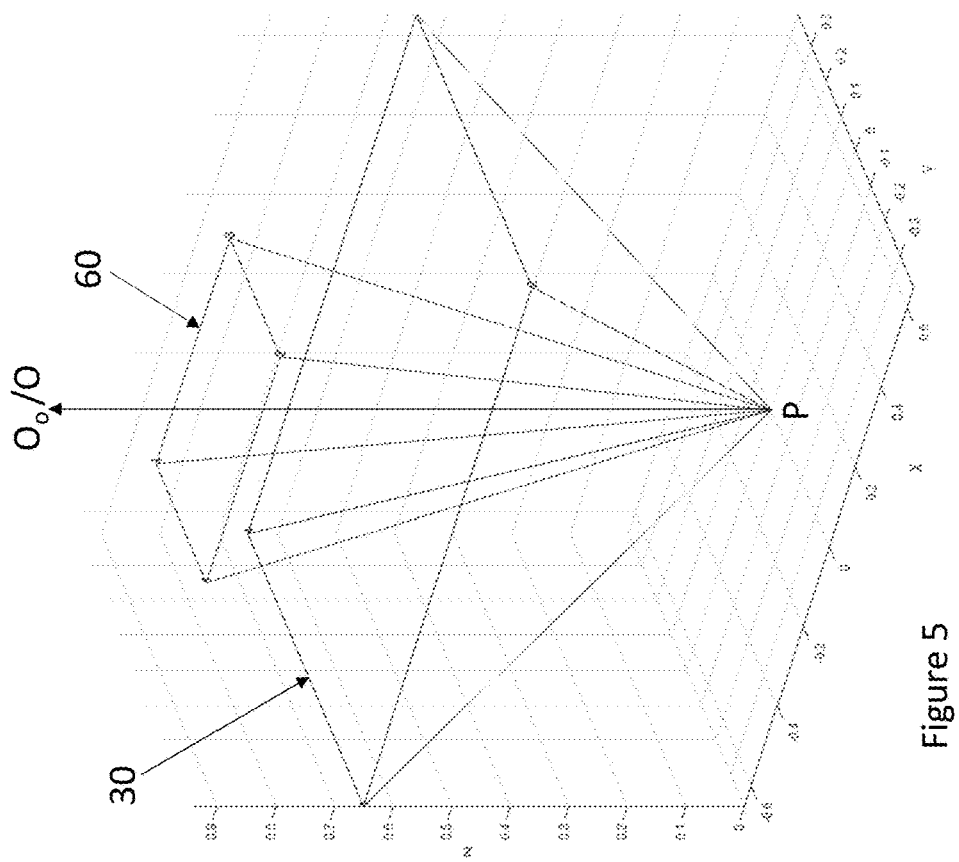

FIG. 4 shows a rotated output camera frustum 50 with respect to the input camera frustum 30. The greater the difference between the selected magnification, i.e. the output camera frustum 50, and the current acquired input image frustum 30 at any given time during a zoom transition, the greater the scope for stabilization (or freedom of rotation), as the angle of view differences between the two camera models is greater. This can be seen by the relationship between the input camera frustum 30 and the extent of rotation of the output camera frustum 70 in FIG. 6 relative to the unrotated frustum 60 in FIG. 5 and the extent of rotation available for the frustum 50 in FIG. 4.

As will be appreciated, when a camera is equipped with a varifocal (zoom) lens, during the zoom transition, the input camera model is updated including any change in focal length and any change to take into account camera panning and/or tilting and with it the input camera frustum 30 is updated. If the output camera model does not need to change, for image stabilization reasons, the effective output field of view will remain the same. The only effect user will see, is an improvement in the image resolution as the digital zoom is increasingly replaced by the optical zoom when the focal length of the lens increases.

When image stabilization is employed, the magnified field of view can remain constant and undistorted in spite of camera movement during the transition (possibly even caused by the user interacting with the camera controls to select the required zoom level).

As explained, frustums with a rectangular base are shown here for illustration and clarity purposes only, not as a limitation. The shape of the frustum of the input camera is typically dictated by the type of the lens projection used and lens distortions. The shape of the output camera frustum represents the desired final projection. This can be the same projection as the input camera, or any other projection, if a change of the projection model is desired. For example, using the real lens projection model to create the input frustum 30 and using a pinhole camera model to create output camera frustum 50, 60, 70, allows for correction of lens distortion. Similarly, it should be appreciated that when the optical axis $O_o$ for the output camera deviates from the optical axis O for the input camera, the re-projection means that the output camera frustum will comprise a trapezoidal rather than a rectangular base.

While the above described example has been based on a zoom transition, the concept described above can be applied to camera rotation involving i.e. panning or tilting, where a selected portion of a displayed field of view is off-center. In this case, the selected portion of the displayed field of view can immediately be brought to the center of the display through the rotation of the virtual camera and as the pan/tilt actuators rotate the physical camera, with the virtual camera being rotated by the difference between the desired orientation and the actual orientation of the pan/tilt mechanism of the physical camera, again with the possibility of taking into account camera movement during the transition.

Note that in some cases, virtual panning/tilting can be applied without zoom.

In this case, a user might request that the camera pan to capture a field of view overlapping with a current field of view (a typical use case would be when controlling a fixed camera).

Using the method described above, the output camera frustum would initially extend outside the input camera frustum and a period of time would be required before the input camera would pan/tilt so that its field of view covered all of the output camera frustum. Nonetheless for the portion of the output camera frustum overlapping the input camera frustum at any given instant during the pan/tilt transition, the above described re-projection could be performed, so allowing the visible portion of the output image to be instantly displayed at a constant position and with the undisplay(able) portion of the output image gradually decreasing as the input camera pans/tilts to the required location i.e. the display would jump immediately to the required pan/tilt location and without distortion, as the camera pans/tilts, fill in the missing portion of the display as it becomes available. This is an example of where a black boundary would be deliberately provided to maintain a stable field of view during a camera transition.

It should be appreciated that any sub-region of the displayed field of view selected to be magnified does not need to have the same aspect ratio of the image from which it is selected. In this case, the camera application can decide whether to crop or distort the selected sub-region as it is re-projected for display. Equally while in many cases the re-projected image will be the same size and resolution as the image from which the sub-region is selected, this is not necessarily the case.

The invention claimed is:
1. A method of controlling a camera comprising:
acquiring, with a camera comprising a lens at a first focal length, a first image with a first field of view, the camera further comprising an input camera projection model including (i) the first focal length and (ii) a first optical axis parameter value;
displaying the first image;
receiving a selection of at least a portion of the first field of view to be displayed as a second image associated with an output camera projection model comprising a point of view in common with the input camera projection model and in which at least one of (i) a second focal length and (ii) a second optical axis parameter value differ from parameters of the input camera projection model; and
iteratively:
   a) adjusting at least one of (i) the first focal length and (ii) the first optical axis parameter value for the lens so that the lens approaches a corresponding at least one of (i) the second focal length and (ii) the second optical axis parameter value of the output camera projection model;
   b) acquiring a subsequent image with the camera using at least one of (i) an adjusted first focal length or (ii) an adjusted optical axis parameter value;
   c) mapping pixel coordinates in the second image, using the output camera projection model, through a normalized 3-dimensional coordinate system to respective locations in the subsequent image, using the at least one of (i) the adjusted first focal length or (ii) the adjusted optical axis parameter value in the input camera projection model, to determine respective values for the pixel coordinates; and
   d) displaying the second image using the respective values for pixel coordinates.

2. The method of claim 1, wherein the mapping further comprises:
   acquiring an indication of movement of the camera in a time between acquiring the subsequent image and acquiring a previous image; and
   rotating mapped pixel coordinates in the normalized 3-dimensional coordinate system to counter camera movement.

3. The method of claim 1, wherein the input camera projection model comprises one of (i) a pinhole projection model, (ii) a rectilinear projection model, or (iii) a fish eye projection model.

4. The method of claim 3, wherein the output camera projection model comprises one of (i) a pinhole projection model, (ii) a rectilinear projection model, or (iii) a fish eye projection model.

5. The method of claim 1, wherein:
   the output camera projection model comprises a rectilinear projection model; and
   the input camera projection model comprises a different projection model.

6. The method of claim 1, wherein:
   the selecting comprises selecting a sub-region of the first image that is displayed; and
   the adjusting comprises adjusting the first focal length of the lens.

7. The method of claim 1, wherein:
   the selecting comprises selecting an off-center region of the first image that is displayed; and
   the adjusting comprises adjusting a pan or tilt angle of the lens so that the adjusted optical axis parameter value approaches the second optical axis parameter value.

8. The method of claim 1, wherein:
   the selecting comprises selecting an off-center sub-region of the first image that is displayed; and
   the adjusting comprises adjusting the first focal length of the lens.

9. The method of claim 1, wherein:
   the selecting comprises selecting an off-center sub-region of the first image that is displayed; and
   the adjusting comprises adjusting the first focal length of the lens and adjusting a pan or tilt angle of the lens so that the adjusted optical axis parameter value approaches the second optical axis parameter value.

10. The method of claim 1, wherein steps a) to d) are repeated until the first adjusted focal length and the adjusted optical axis parameter value for the lens match the corresponding the second focal length and the second optical axis parameter value.

11. The method of claim 1, wherein steps a) to d) are repeated only to a point that all of the portion of the first field of view that is selected can be displayed.

12. A handheld camera comprising:
   a lens at a first focal length;
   a lens actuator configured to change the first focal length of the lens;
   an input camera projection model including (i) the first focal length and (ii) a first optical axis parameter value; and
   a processor configured to (i) run a camera application and (ii) control the handheld camera to perform:
      acquiring a first image with a first field of view;
      displaying the first image;
      receiving a selection of at least a portion of the first field of view to be displayed as a second image associated with an output camera projection model comprising a point of view in common with the input camera projection model and in which at least one of (i) a second focal length and (ii) a second optical axis parameter value differ from parameters of the input camera projection model; and
      iteratively:
         a) adjusting at least one of (i) the first focal length and (ii) the first optical axis parameter value for the lens so that the lens approaches a corresponding at least one of (i) the second focal length and (ii) the second optical axis parameter value of the output camera projection model;
         b) acquiring a subsequent image using at least one of (i) an adjusted first focal length or (ii) an adjusted optical axis parameter value;
         c) mapping pixel coordinates in the second image, using the output camera projection model, through a normalized 3-dimensional coordinate system to respective locations in the subsequent image, using the at least one of (i) the adjusted first focal length or (ii) the adjusted optical axis parameter value in the input camera projection model, to determine respective values for the pixel coordinates; and
         d) displaying the second image using the respective values for pixel coordinates.

13. The handheld camera of claim 12, wherein steps b) and c) are performed in camera firmware prior to writing the respective values for the pixel coordinates for the second image to memory.

14. The handheld camera of claim 12, wherein steps b) and c) are performed in either in camera firmware or by the camera application after writing the respective values for the pixel coordinates for the subsequent image to memory.

15. One or more non-transitory computer-readable media storing computer-executable instructions that, when executed by one or more processors, cause the one or more processors to perform:

acquiring, with a camera comprising a lens at a first focal length, a first image with a first field of view, the camera further comprising an input camera projection model including (i) the first focal length and (ii) a first optical axis parameter value;

displaying the first image;

receiving a selection of at least a portion of the first field of view to be displayed as a second image associated with an output camera projection model comprising a point of view in common with the input camera projection model and in which at least one of (i) a second focal length and (ii) a second optical axis parameter value differ from parameters of the input camera projection model; and iteratively:

a) adjusting at least one of (i) the first focal length and (ii) the first optical axis parameter value for the lens so that the lens approaches a corresponding at least one of (i) the second focal length and (ii) the second optical axis parameter value of the output camera projection model;

b) acquiring a subsequent image with the camera using at least one of (i) an adjusted first focal length or (ii) an adjusted optical axis parameter value;

c) mapping pixel coordinates in the second image, using the output camera projection model, through a normalized 3-dimensional coordinate system to respective locations in the subsequent image, using the at least one of (i) the adjusted first focal length or (ii) the adjusted optical axis parameter value in the input camera projection model, to determine respective values for the pixel coordinates; and d) displaying the second image using the respective values for pixel coordinates.

16. A system comprising:

a fixed mount camera comprising a lens at a first focal length, an input camera projection model including (i) the first focal length and (ii) a first optical axis parameter value; and one or more non-transitory computer-readable media storing computer-executable instructions that, when executed by one or more processors operably connected to the fixed mount camera, cause the one or more processors to perform:

acquiring, with the fixed mount camera, a first image with a first field of view;

displaying the first image;

receiving a selection of at least a portion of the first field of view to be displayed as a second image associated with an output camera projection model comprising a point of view in common with the input camera projection model and in which at least one of (i) a second focal length and (ii) a second optical axis parameter value differ from parameters of the input camera projection model; and iteratively:

a) adjusting at least one of (i) the first focal length and (ii) the first optical axis parameter value for the lens so that the lens approaches a corresponding at least one of (i) the second focal length and (ii) the second optical axis parameter value of the output camera projection model;

b) acquiring a subsequent image with the fixed mount camera using at least one of (i) an adjusted first focal length or (ii) an adjusted optical axis parameter value;

c) mapping pixel coordinates in the second image, using the output camera projection model, through a normalized 3-dimensional coordinate system to respective locations in the subsequent image, using the at least one of (i) the adjusted first focal length or (ii) the adjusted optical axis parameter value in the input camera projection model, to determine respective values for the pixel coordinates; and d) displaying the second image using the respective values for pixel coordinates.

17. The system of claim 16, wherein the fixed mount camera comprises a lens actuator configured to change a focal length and a pan and tilt angle of the lens.

18. The system of claim 16, wherein steps b) and c) are performed in camera firmware prior to writing the respective values for the pixel coordinates for the second image to memory.

19. The system of claim 16, wherein:

the fixed mount camera comprises a processor configured to run a non-interactive camera application; and the computer-executable instructions are configured to (i) display the first image, (ii) enable a user of a computing device to select the portion of the first field of view to be displayed as the second image, and (iii) cause the computing device to iteratively display the second image.

* * * * *